United States Patent [19]
Ribaldone et al.

[11] 3,715,393
[45] Feb. 6, 1973

[54] METHOD OF PREPARING SODIUM NITRILOTRIACETATE

[75] Inventors: Giuseppe Ribaldone, Gallarate; Salvatore Gafa, Ferrara, both of Italy

[73] Assignee: Montecatini Edison S.p.A., Milan, Italy

[22] Filed: May 15, 1970

[21] Appl. No.: 37,817

[30] Foreign Application Priority Data

May 20, 1969 Italy...............................17018 A/69

[52] U.S. Cl. .............................................260/534 E
[51] Int. Cl. .............................................C07c 99/10
[58] Field of Search ...................................260/534 E

[56] References Cited

UNITED STATES PATENTS

| | | | |
|---|---|---|---|
| 3,183,262 | 5/1965 | Singer et al. | 260/534 E |
| 3,463,811 | 8/1969 | Godrey et al. | 260/534 E |
| 3,409,666 | 11/1968 | Foremon | 260/534 E |

Primary Examiner—Lorraine A. Weinberger
Assistant Examiner—John F. Terapane
Attorney—Hubbell, Cohen & Stiefel

[57] ABSTRACT

Preparation of $N(CH_2COONa)_3$ in crystalline form by hydrolyzing $N(CH_2CN)_3$ in the presence of NaOH. Involves suspending $N(CH_2CN)_3$ in recycled mother liquor, adding aqueous NaOH to the suspension, partially hydrolyzing at about 65° to 75°C., further hydrolyzing at about 70° to 90°C. to form $N(CH_2COONa)_{32}COONa)_3$ from the mother liquor, and recycling the mother liquor.

3 Claims, 1 Drawing Figure

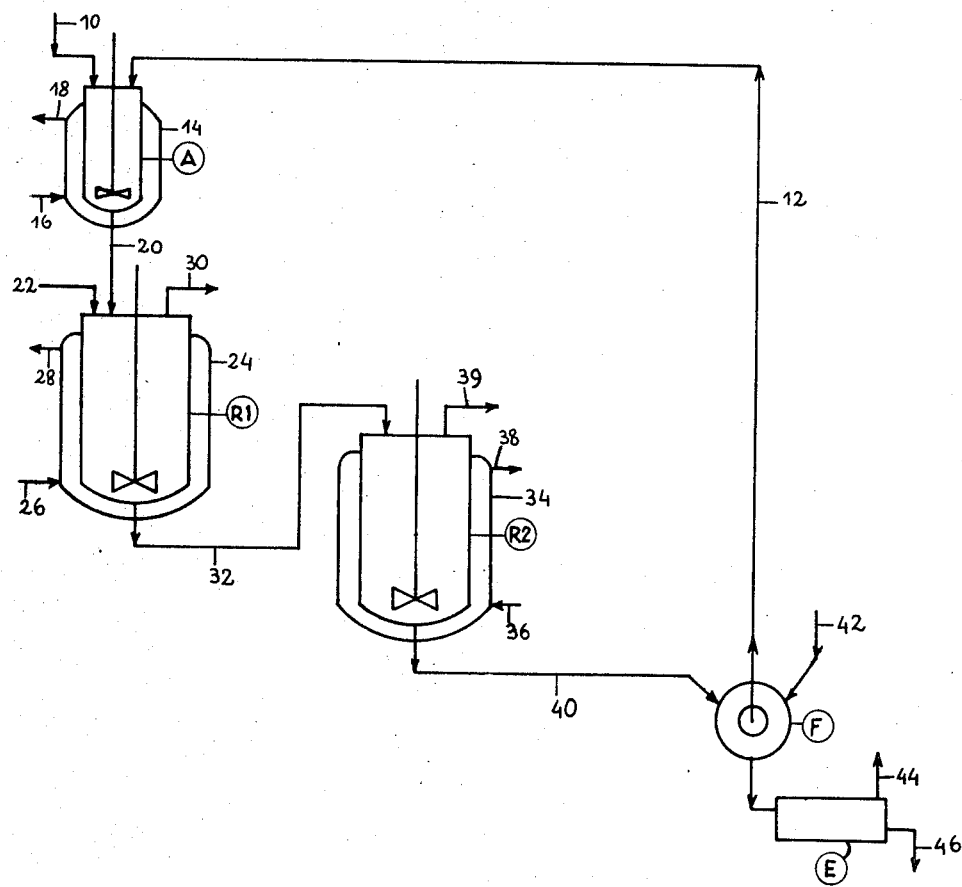

METHOD OF PREPARING SODIUM NITRILOTRIACETATE

BACKGROUND OF THE INVENTION

1. Field of the Invention

The present invention relates to a process for the preparation of sodium nitrilotriacetate, $N(CH_2COONa)_3$, by hydrolysis of nitrilotriacetonitrile, $N(CH_2CN)_3$, with sodium hydroxide.

2. Description of the Prior Art

As is well known, sodium nitrilotriacetate is an important chelating agent, one of its chief applications being as an additive for detergents.

Sodium nitrilotriacetate can be prepared by reacting $NH_3$ with $CH_2O$ and $NaCN$ in aqueous medium the presence of $NaOH$. It is thus possible to obtain sodium nitrilotriacetate directly, in the form of an aqueous solution. The yields, however, are poor and the solution obtained contains considerable quantities of by-products, such as sodium iminodiacetate, sodium glycolate, and sodium formate, so that it is difficult to isolate the sodium nitrilotriacetate in the pure form.

Another known method is to effect saponification of nitrilotriacetonitrile with a substantially stoichiometric amount of NaOH in an aqueous solution, by gradually adding the nitrile to a warm solution of NaOH or by mixing the nitrile with NaOH and thereafter heating the mixture to the reaction temperature. However, in such a process a solution is obtained, from which the sodium nitrilotriacetate must be recovered by evaporation, which is a burdensome, time consuming operation.

SUMMARY OF THE INVENTION

The present invention provides a continuous process for hydrolyzing nitrilotriacetonitrile to produce the sodium salt of nitrilotriacetic acid, which process results directly in this salt in crystallized form, along with one mole of water.

In addition to the advantage of directly obtaining a solid product with quantitative yields, the process of this invention offers the advantage of enabling one to operate at relatively low temperatures (65°–90°C). Such low temperatures are advantageous in that there is less tendency toward corrosion of the equipment. Moreover, the process of this invention enables one to obtain a particularly pure and white product.

The present invention provides a continuous process for the preparation of sodium nitrilotriacetate in crystallized form, through the hydrolysis of nitrilotriacetonitrile with sodium hydroxide. The method is characterized in that nitrilotriacetonitrile is suspended in recycled mother liquor at a temperature of from about 20° to 60°C., and thereafter to the suspension there is added an aqueous solution of sodium hydroxide in the stoichiometric quantity necessary to effect hydrolysis of the nitrilotriacetonitrile. The hydrolysis is carried out in two stages, (1) partial hydrolysis at a temperature of from about 65° to 75°C., then (2) completion of the hydrolysis at a temperature of from about 70° to 90°C. Sodium nitrilotriacetate is then separated from the mother liquor, which mother liquor is then recycled. The mother liquor that is recycled contains sodium nitrilotriacetate and sodium hydroxide, the later being present in an amount of from about 20 to 30 percent of the stoichiometric amount with respect to the nitrilotriacetonitrile to be hydrolyzed.

The amount of sodium hydroxide contained in the recycled mother liquor is between 20 and 30 percent of the stoichiometric amount required for the hydrolysis of the nitrile. That is, the amount of NaOH present in the mother liquor is from about 0.6 to 0.9 mole of NaOH per mole of nitrile.

Description of the Drawing

The process of our invention is schematically illustrated in the attached drawing.

Description of the Preferred Embodiments

Referring to the drawing, in mixer A there is disposed via conduit 10 and via conduit 12 nitrilotriacetonitrile (NTN) and recycled mother liquor, to thereby form a suspension of NTN in the mother liquor. The temperature of the suspension is maintained at from about 20° to 60°C., as by means of a jacket through which suitable heat transfer fluid may be circulated via lines 16 and 18. Into a first reactor $R_1$ is fed the NTN suspension via conduit 20, and via conduit 22 there is also fed an aqueous NaOH solution, the NaOH solution being present in stoichiometric quantity to effect hydrolysis of the nitrilotriacetonitrile to sodium nitrilotriacetate. There results a partial hydrolysis of the nitrilotriacetonitrile to sodium nitrilotriacetate and sodium N(2-acetoamido)-iminodiacetate

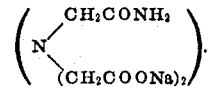

The temperature in reactor $R_1$ is maintained at from about 65° to 75°C., as by circulating cold water inside cooling jacket 24 via lines 26 and 28, and through evaporation of $NH_3$ and $H_2O$, which exit via line 30. The residence time of the reactants in reactor $R_1$ is desirably from about 45 to 60 minutes. From about 75 to 90 percent of the nitrilotriacetonitrile is hydrolyzed to sodium nitrilotriacetate (SNTA), while from about 8 to 20 percent of the nitrilotriacetonitrile is hydrolyzed to sodium N(2-aceto-amide)-iminodiacetate (SADA).

The resulting aqueous suspension of sodium nitrilotriacetate (SNTA), SADA, nitrilotriacetonitrile and NaOH is discharged from reactor $R_1$ via conduit 32 into reactor $R_2$.

In reactor $R_2$ the temperature is maintained at from about 70° to 90°C. by circulation of hot water or stream inside jacket 34 via lines 36 and 38. The residence time of the reactants is desirably from about 60 to 80 minutes. In reactor $R_2$ the residual, unconverted nitrilotriacetonitrile and the intermediate products are converted into sodium nitrilotriacetate. Gaseous $NH_3$ and $H_2O$ exit via line 39.

The crystals of sodium nitrilotriacetate monohydrate, $N(CH_2COONa)_3 \cdot H_2O$, together with the mother liquor are passed via conduit 40 to filter F, in which the crystals are separated from the mother liquor. The filtering is conducted at a temperature of from about 40° to 90°C. The sodium nitrilotriacetate crystals are then washed with about 20 percent by weight of water, via conduit 42. This washing water is then added to the mother liquor. The recovered mother liquor, after being cooled down to about 20° to 60°C, is then recycled to mixer A via conduit 12.

As previously noted, the mother liquor that is re-cycled contains sodium nitrilotriacetate (SNTA) as well as NaOH In admixing the recycle mother liquor with nitrilotriacetonitrile (NTN) that is to be hydrolized to form a suspension, the admixture is such proportions that the molor ratio of SNTA to NTN in the suspension is at least 0.5. A particularly preferred molar ratio of SNTA to NTN in the suspension is about 0.76.

The sodium nitrilotriacetate crystals, which contain from about 10 to 15 percent by weight of moisture, are dryed in dryer E, with the water exiting via line 44 and the crystals exiting via line 46.

According to the method of this invention, the process may alternatively be carried out using three reactors operating at increasing temperatures, for instance, the first and second reactors at 65° to 70°C, and the third at 80° to 90°C. The total residence time of the reactants in the three reactors should desirably be from about 90 to 120 minutes.

The sodium nitrilotriacetate monohydrate obtained by the process of this invention is obtained in an easily filterable form and is substantially pure.

The process of this invention, when carried out in a continuous manner, allows one to obtain virtually a quantitative transformation of nitrilotriacetonitrile into dry sodium nitrilotriacetate, without the need for concentrating the solution.

The following examples will further illustrate the invention. All parts are by weight unless otherwise stated.

EXAMPLE 1

This example was carried out as a continuous process using the apparatus schematically represented in the drawing. In a mixer A there were suspended continuously every hour 28.6 g of nitrilotriacetonitrile (NTN) in 121.8 g of recycled mother liquor, the temperature of the suspension being maintained at about 20°C. The suspension thus obtained contained:

| | |
|---|---|
| NTN | 28.6 g=0.211 mole |
| $H_2O$ | 69.8 g=3.870 mole |
| NaOH | 7.6 g=0.189 mole |
| SNTA | 44.4 g=0.161 mole |

This suspension was fed at a feed rate of 150.4 g/hr (121 cc/hr), to reactor $R_1$ together with a solution of NaOH (feed rate: 50.6 g/hr or 34 cc/hr) consisting of:

| | |
|---|---|
| NaOH | 25.3 g=0.633 mole |
| $H_2O$ | 25.3 g=1.405 mole |

The reaction mixture was maintained at at temperature of about 70°C. with a residence time of 60 minutes in reactor $R_1$ (this reactor having a volume of 155 cc). The slurry flowing out of reactor $R_1$ contained 5.5 percent SADA [N(2-aceto-amide-iminodiacetate] and 92 percent SNTA (sodium nitrilotriacetate). The slurry was then fed to reactor $R_2$ where it was maintained at a temperature of about 90°C. for 80 minutes in order to complete the hydrolysis. The slurry flowing out of reactor $R_2$ contained no NTN or SADA.

The amount of $NH_3$ and $H_2O$ evolved from $R_1$ and $R_2$ were as follows:

| | |
|---|---|
| $NH_3$ | 10.75 g/per hour=0.633 mole per hour |
| $H_2O$ | 15.2 g/per hour=0.28 mole per hour |

The slurry flowing out of $R_2$ was then filtered at 90°C. and the filter cake of SNTA was washed with 10 g of water. The mother liquor was combined with the washing water to form the recycle mother liquor which was recycled to mixer A.

The color of the recycle mother liquor solution remained constant at from 300 to 350 APHA. For each cycle there was an accumulation of $CN_-$ of about 32 ppm, (resulting from decomposition of the nitrilotriacetonitrile) so that it was necessary to replace a part of the recycled liquor about every 100 cycles.

The moist filter cake, consisting of 47.5 g of SNTA and 5 g of $H_2O$, was dried in an oven. The dry product was essentially free of SADA and showed a content of SNTA in excess of 98 percent. About 80 percent of the product was in the form of granules of from 0.1 to 0.25 mm.

EXAMPLE 2

A continuous example was carried out using the same reactants and under the same conditions as described in example 1. Three reactors were employed, the first and second each being maintained at 70°C., and the third at 90°C. The residence time for the mixture in each reactor was 30 minutes. Aqueous NaOH solution was fed only into the first reactor.

The mixture exiting from the second reactor contained 1.5 percent SADA and 98.5 percent SNTA. The product exiting from the third reactor was free of SADA. The content, expressed as sodium nitrilotriacetate monohydrate, of the dry product was in excess of 98 percent. The amounts of the products involved in the reaction and the color of the solution were the same as in example 1. In this example, as in example 1, there was an increase of $CN_-$ in solution equal to about 32 ppm per each cycle. The $CN_-$ originated from the decomposition of the nitrilotriacetonitrile.

Modifications and variations can, of course, be made with departing from the spirit and scope of the invention.

Having thus described our invention, what we desire to secure by Letters Patent and hereby claim is:

1. In a continuous method of making sodium nitrilotriacetate in crystalline form by hydrolyzing nitrilotriacetonitrile in the presence of sodium hydroxide, the improvement comprising a. suspending nitrilotriacetonitrile in recycled mother liquor, said mother liquor containing sodium nitrilotriacetate and sodium hydroxide, the amount of sodium hydroxide contained in said mother liquor being from about 20 to 30 percent of the stoichiometric amount required to effect hydrolysis of said nitrilotriacetonitrile, the temperature of said suspension being maintained at from about 20° to 60°C, b. adding to said suspension an aqueous solution of sodium hydroxide in an amount of 3 moles of NaOH per mole of nitrilotriacetonitrile whereby the total amount of NaOH in the reaction mixture is about 3.6 to 3.9 moles per mole of nitrilotriacetonitrile, c. partially hydrolyzing said nitrilotriacetonitrile at a temperature of from about 65° to 75°C to form a mixture comprising sodium nitrilotriacetate and sodium-N-(2-acetamido)-iminodiacetate, d. completing the hydrolysis at a temperature which is higher than the temperature in step (c) and which is from about 70° to 90°C to form sodium nitrilotriacetate, e. separating and recovering sodium nitrilotriacetate crystals from said mother liquor, and f. thereafter recycling said mother liquor.

2. The method of claim 1, wherein said crystals of sodium nitrilotriacetate separated from the mother liquor are washed with water, the wash water is then added to the mother liquor, and the mother liquor-water is then recycled.

3. The method of claim 1 wherein said sodium nitrilotriacetate is separated from the mother liquor at a temperature of from about 40° to 90°C.

* * * * *

PO-1050
(5/69)

UNITED STATES PATENT OFFICE
CERTIFICATE OF CORRECTION

Patent No. 3,715,393          Dated February 6, 1973

Inventor(s) GIUSEPPE RIBALDONE and SALVATORE GAFA

It is certified that error appears in the above-identified patent and that said Letters Patent are hereby corrected as shown below:

Abstract, line 1: "Preparation of" should read -- A method of preparing --. Abstract, line 2-3: "NaOH. Involves" should read -- NaOH which comprises.--. Abstract, line 7: "$N(CH_2COONa)_{3}$ $_2COONa)_3$ from" should read --, $N(CH_2COONa)_3$, separating $N(CH_2COONa)_3$ from --. Column 1, line 6: "process" should read -- method --. Column 1, line 8: "hydrolysis of" should read -- hydrolyzing --. Column 1, line 15: "medium the" should read -- medium in the --. Column 1, lines 18-19: "solution obtained" should read -- obtained solution --. Column 1, line 22: "in the pure" should read -- in pure --. Column 1, line 29: "process" should read -- method --. Column 1, line 34: "process" should read -- method --. Column 1, line 36: "process" should read -- method --. Column 1, line 37: "directly in this" should read -- directly in the production of this --. Column 1, lines 40-41: "the process of this" should read -- the method of the --. Column 1, line 46: "process of this" should read -- method of the --. Column 1, line 48: "process" should read -- method --. Column 1, lines 54-55: "thereafter to the suspension there is added" should read -- thereafter, there is added to the suspension --. Column 2, line 8: "the process of our" should read -- the method of the --. Column 2, line 17: "which suitable" should read -- which a suitable --. Column 2, line 45: "stream" should read -- steam --. Column 2, line 62: "cooled down to" should read -- cooled to --.

Column 3, lines 9-10: "the method of this invention, the proce should read -- the invention, the method --. Column 3, line 17 "process" should read -- method --. Column 3, line 19:

-1-

UNITED STATES PATENT OFFICE
CERTIFICATE OF CORRECTION

Patent No. 3,715,393      Dated  February 6, 1973

Inventor(s) GIUSEPPE RIBALDONE and SALVATORE GAFA

It is certified that error appears in the above-identified patent and that said Letters Patent are hereby corrected as shown below:

"process" should read -- method --. Column 3, line 29: "as a continuous process" should read -- continuously --. Column 3, lines 36-39:

| " NTN | | -- -NTN |
| $H_2O$ | should read | $-H_2O$ |
| NaOH | | -NaOH |
| SNTA " | | -SNTA --. |

Column 3, lines 46-47:

| " NaOH | should read | -- -NaOH |
| $H_2O$ " | | $-H_2O$ |

Column 3, line 47: "mole" should read -- moles --. Column 4, line 3: "CN_" should read -- CN⁻ --. Column 4, line 6: "part" should read -- portion --. Column 4, line 30: "CN_" should read -- CN⁻ --. Column 4, line 31: "CN_" should read -- CN⁻ --. Column 4, line 35: "with" should read -- without --

Signed and sealed this 25th day of December 1973.

(SEAL)
Attest:

EDWARD M. FLETCHER, JR.　　　　RENE D. TEGTMEYER
Attesting Officer　　　　　　　Acting Commissioner of Patents